US012595898B2

(12) United States Patent
Henrici et al.

(10) Patent No.: US 12,595,898 B2
(45) Date of Patent: Apr. 7, 2026

(54) LED CONNECTION ELEMENT

(71) Applicant: BJB GmbH & Co. KG, Arnsberg (DE)

(72) Inventors: Philipp Henrici, Arnsberg (DE); Olaf Baumeister, Sundern (DE); Mark Weber, Arnsberg (DE)

(73) Assignee: BJB GmbH & Co. KG, Arnsberg (DE)

( * ) Notice: Subject to any disclaimer, the term of this patent is extended or adjusted under 35 U.S.C. 154(b) by 0 days.

(21) Appl. No.: 19/055,001

(22) Filed: Feb. 17, 2025

(65) Prior Publication Data

US 2025/0264212 A1 Aug. 21, 2025

(30) Foreign Application Priority Data

Feb. 19, 2024 (DE) ..................... 10 2024 104 503.5

(51) Int. Cl.
*F21Y 115/10* (2016.01)
*F21V 19/00* (2006.01)

(52) U.S. Cl.
CPC ....... *F21V 19/0055* (2013.01); *F21Y 2115/10* (2016.08)

(58) Field of Classification Search
CPC . F21V 19/0055; F21V 19/004; F21Y 2115/10
See application file for complete search history.

(56) References Cited

U.S. PATENT DOCUMENTS

2012/0287644 A1* 11/2012 Wronski ................ F21V 13/00 362/296.01
2013/0065419 A1 3/2013 Sakai
2013/0084748 A1* 4/2013 Zaderej ................ H01R 4/4821 439/620.01
2013/0265779 A1* 10/2013 Scordino .................. F21K 9/20 362/368
2018/0216801 A1* 8/2018 Thiele ................... F21V 19/004
2019/0234602 A1* 8/2019 Eckert ..................... F21V 15/01

FOREIGN PATENT DOCUMENTS

DE 102017101809 A1 8/2018
DE 202022105271 U1 9/2022
DE 202023105716 U1 10/2023
EP 2963341 A1 1/2016

* cited by examiner

*Primary Examiner* — Evan P Dzierzynski
(74) *Attorney, Agent, or Firm* — Smartpat PLC

(57) ABSTRACT

A connection element electrically connects an LED light source. The LED light source has a circuit board with contact fields to supply an LED. A frame rests on an arrangement surface of a counter-bearing and holds the circuit board thereon. The frame includes an outer ring and an inner ring. The inner ring is held within the outer ring and overlaid on the circuit board to hold the circuit board vertically to the arrangement surface. The outer ring surrounds the circuit board and holds the circuit board parallel to the arrangement surface on the counter-bearing. Locking lugs are formed by the inner ring. Locking springs are arranged in the outer ring, overlap the locking lugs of the inner ring, and exert a tensile force on the inner ring towards the arrangement surface. A spring receiving space for the locking spring extends into an area below the arrangement surface.

10 Claims, 8 Drawing Sheets

LED CONNECTION ELEMENT

CROSS-REFERENCE TO RELATED APPLICATION

This application claims the benefit of German Patent Application DE 10 2024 104 503.5, filed on Feb. 19, 2024, the content of which is incorporated by reference in its entirety.

BACKGROUND

Connection elements for the electrical connection of an LED light source and for simultaneous mechanical fixing are known, for example, from the applicant's EP 2 083 489 A1. A ring-shaped component in the broadest sense has an integrated contact arrangement which enables the connection of external connecting conductors and transfers the electricity thus fed in to contact fields of a circuit board provided with LEDs.

The ring-shaped component is simultaneously overlaid on the circuit board. For this purpose, the component has a central recess which receives the circuit board.

Using suitable fasteners such as screws, expansion dowels, etc., the ring-shaped component is fixed on a counter-bearing, usually a heat sink or a light sheet, thus holding the circuit board between itself and the counter-bearing.

In this way, the LED light source is mechanically fixed and electrically connected to a corresponding power supply.

This type of connection element is widely used in the manufacture of modern luminaires using LED light sources and has been further developed compared to the exemplary embodiment disclosed in the aforementioned publication.

In particular, the dimensions of the contact arrangement have been minimized in order to make the connection element as flat as possible in terms of its height measured in the direction of light emission. This avoids any shading of the light emitted from the LED caused by the connection element, which significantly improves the efficiency of the light source.

In addition, optics and reflectors mounted on the connection element can be moved closer to the plane of light emission of the LED. In this way, the efficiency of reflectors and optics can be significantly improved.

The applicant has published a further development of such connection elements corresponding to the generic concept in German utility model DE 20 2023 105 716 U1. In that document, for reasons of improved logistics, the ring-shaped connection element is divided into an inner ring and an outer ring. The outer ring serves to fix the circuit board in a direction parallel to an arrangement surface of the counter-bearing. The inner ring is inserted into the outer ring and is overlaid on the circuit board at least in some areas. In this way, the inner ring secures the circuit board in the direction vertical to the arrangement surface on the counter-bearing. Also in this embodiment, the connection element has a contact arrangement which enables the electrical connection of the circuit board to external connection conductors.

SUMMARY

The disclosure relates to a connection element for the electrical connection of an LED light source. The LED light source has a circuit board which is provided with contact fields for the electrical supply of the LED. The connection element includes a frame which is intended to rest on an arrangement surface of a counter-bearing and to hold the circuit board on this arrangement surface. The frame is formed by an outer ring and an inner ring. The inner ring is held within the outer ring and is intended to be overlaid on the circuit board at least in some areas and thus to hold the circuit board vertically to the arrangement surface on the counter-bearing. The outer ring is intended to surround the circuit board and to hold the circuit board parallel to the arrangement surface on the counter-bearing. Locking lugs are formed by the inner ring. Locking springs are arranged in the outer ring, overlap the locking lugs of the inner ring and exert a tensile force on the inner ring in the direction of the arrangement surface.

A number of detailed requirements must be taken into account for the mechanical fixing, electrical supply and safe operation of an LED light source. The thickness of the circuit boards—measured in the direction of light emission or vertically to the arrangement surface—is subject to considerable variations.

The circuit boards must be pressed onto the counter-bearing with a certain pressing force to ensure optimized heat dissipation. The durability of the LED light source can only be guaranteed if the operating heat generated by the LED is sufficiently dissipated.

In order to optimize the heat transfer from the circuit board to the counter-bearing, various types of heat conducting agents are introduced between the circuit board and the counter-bearing. These range from thermal pastes to comparatively strong/thick thermal pads. Generally, the manufacturer of a luminaire selects the heat conducting agent they consider suitable. The connection element must also be able to compensate for the additional thermal conductivity layer introduced.

Finally, it is important to ensure that the contact forces between the contact fields of the circuit board and the contact arrangement of the connection element are optimized to ensure the lowest possible electrical contact resistance. In a two-part connection element, on which the present application is based, the contact arrangement comprises a connection contact seated in the outer ring, to which the connection conductors are attached. The inner ring carries a supply contact that rests on the contact field of the circuit board.

The connection contact and the supply contact also have mutual contact surfaces in order ultimately to be able to supply electricity. With the two-part connection element according to the disclosure, it is therefore also important to ensure that the pressing forces between the connection contact and the supply contact are also optimized for the lowest possible contact resistance.

The object of the present disclosure is therefore to provide a suitable locking spring arrangement for a two-part connection element, which ensures sufficient pressing forces of the inner ring on the circuit board whilst taking into account the required tolerance compensation.

The object is achieved by a connection element as disclosed herein, according to which a spring receiving space for the locking spring is provided, which extends in relation to the frame resting on the arrangement surface into an area below the arrangement surface.

In order to be able to compensate for large tolerances with regard to the thickness of the circuit board and, if applicable, heat conducting agents arranged between the circuit board and the counter-bearing, it is necessary that the inner ring can perform a comparatively large movement stroke vertically to the arrangement surface of the counter-bearing or in the direction of light emission from the LED. At the same time, the locking spring must be able to exert sufficient pressing forces in the direction of the arrangement surface in every position of the inner ring caused by the tolerances.

This requires a locking spring that can cover a comparatively large spring travel and is able to apply sufficient pressing forces. For a large spring travel, space must be created in the connection element. For large spring forces, certain dimensions of the locking spring element are required. These requirements for a locking spring are inconsistent with the technical need to create connection elements that are as flat as possible in order to avoid emerging light being shaded by the connection element.

The disclosed design provides for the required installation space for the locking spring that is to be used to be moved to an area below the arrangement plane of the counter-bearing or at least to be pulled into this area. In this way, the thickness of the connection element measured in the direction of light emission or vertically to the arrangement plane of the counter-bearing can be reduced to the absolute minimum. Shading of the emerging light by the connection element is safely avoided or greatly reduced. Nevertheless, there is sufficient installation space for a locking spring element, which requires a sufficiently large spring receiving space due to the spring forces to be applied and in particular the required spring travel.

In one specific embodiment, the spring receiving space is formed by a pin which rises from the underside of the outer ring and is directed in particular counter to the direction of light emission. The spring element can be arranged in this pin and thus receives sufficient space for movement for the required spring travel, particularly in the case of a spring element shown in the exemplary embodiment with a pivot axis aligned parallel to the arrangement surface.

In a further alternative embodiment, the spring receiving space is formed by a cavity in the counter-bearing. For example, a corresponding cavity or recess—whether configured as a blind hole or a through hole—can therefore be made in a heat sink. A locking spring seated here therefore has sufficient installation space and sufficient space to generate extensive spring travel.

In a particularly preferred embodiment, it is provided that the pin of the outer ring forming the spring receiving space be seated in the cavity of the counter-bearing. In this way, the pin formed by the outer ring is well protected against mechanical damage by the surrounding material of the counter-bearing, in particular the heat sink.

In order to be able to absorb high spring forces, a sufficient material thickness is required in the area of interaction with the locking spring, especially in the case of an inner ring made of plastic. Specifically, the locking projection must therefore be formed to be sufficiently strong that it does not undergo any plastic deformation under the influence of the spring forces of the locking spring.

However, this means that space must be created for a correspondingly thick material support, which—as already discussed above—runs counter to the requirements, in particular, for flat connection elements.

Beneficially, the inner ring forms a spring support leg which carries the locking projection. In particular, it is provided here that the spring support leg protrudes into the spring receiving space and rests against a wall bordering the spring receiving space.

The inventors recognized that the spring receiving space creates space to provide a locking projection that is sufficiently dimensioned to absorb the spring forces, without this having a disadvantageous effect on the dimensioning of that part of the connection element located above the arrangement surface.

In addition, the inventors recognized that the locking projection can be kept comparatively small in its dimensions if it rests against a wall bordering the spring space and is supported there. The wall that borders the pin or that borders the cavity is therefore used to absorb the forces acting on the locking projection. This means that the spring support leg forming the locking projection can be dimensioned to be smaller, since the spring forces are also absorbed by the respective wall.

In a particularly preferred embodiment, the spring support leg rests against the wall forming the pin, which is in turn supported against the wall bordering the cavity. Since the counter-bearing is usually made of a metal, especially aluminium, the pin and spring support leg components made of the plastic material of the inner ring and outer ring are supported very well on a more stable material in a load-dissipating manner.

The inventors further recognized that the locking spring for holding the inner ring is also suitable for fixing the outer ring to the counter-bearing. In this way, the locking spring of the outer ring has a double purpose.

Particularly when the counter-bearing is a heat sink, undercuts are often formed when drilling the holes for the cavity in the area of the cooling fins into which the locking spring for fastening the outer ring to the counter-bearing can engage.

Alternatively, it is conceivable for the pin of the outer ring to be formed in the manner of an expansion dowel. For this purpose, the pin can be configured with a slot vertical to the arrangement surface, for example. The pin walls are deflected via an expansion element and can engage on the counter-bearing in a friction-fitting and/or form-fitting manner. Here too, undercuts formed by drilling holes in a heat sink in the area of the cooling fins are suitable, for example.

BRIEF DESCRIPTION OF THE DRAWINGS

The invention will now be explained in more detail by reference to two exemplary embodiments showing further advantages and features.

DETAILED DESCRIPTION

Figure 1:
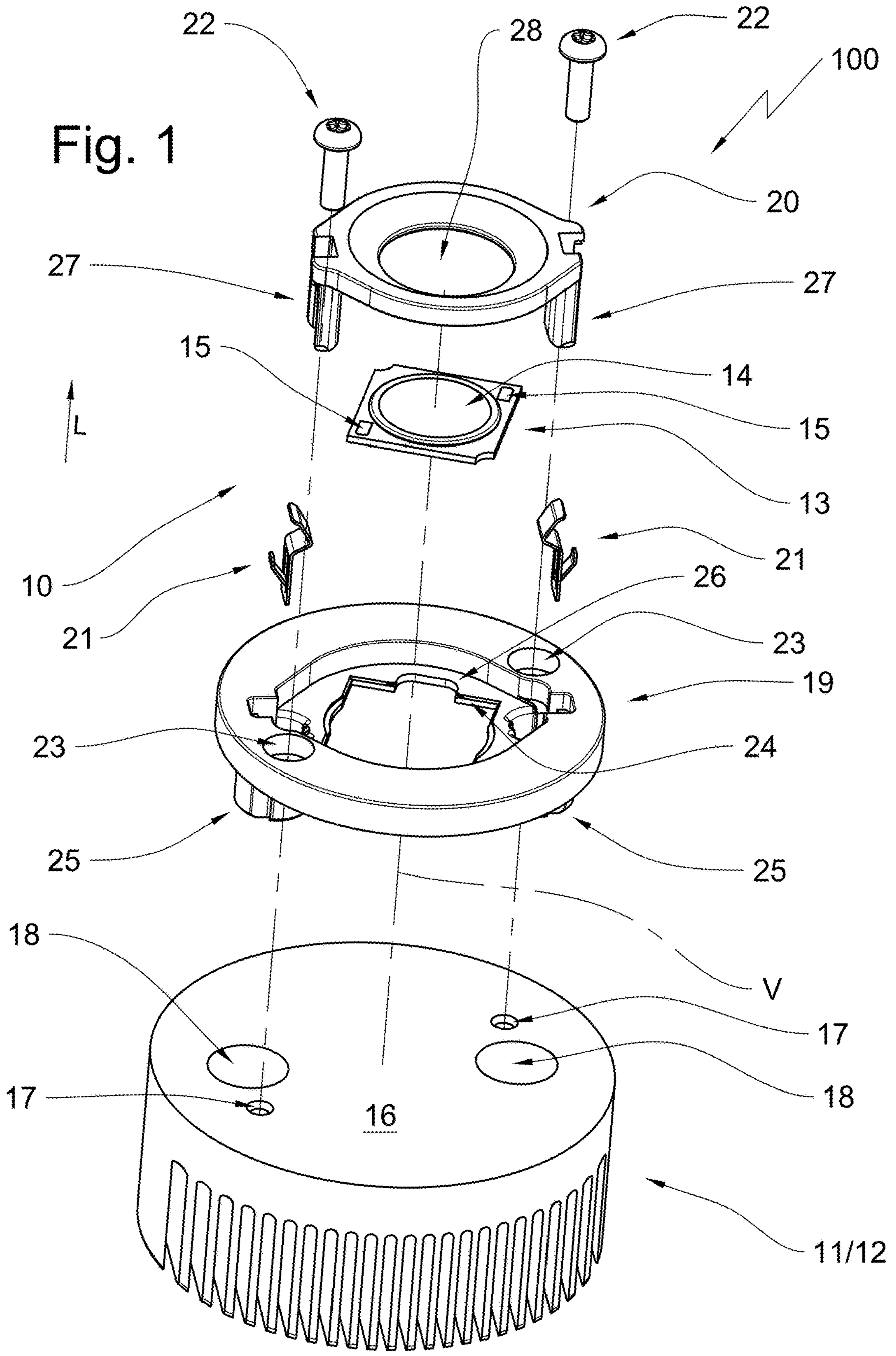
FIG. 1 shows a connection element, an LED light source, and a counter-bearing in an exploded view.

In the figures, an assembly using the connection element 10 as a whole is provided with the reference numeral 100.

In addition to the counter-bearing 11 in the form of a heat sink 12, the assembly 100 also comprises a circuit board 13. The circuit board 13 is provided with an LED 14 and also carries contact fields 15.

The counter-bearing 11 has an arrangement surface 16 aligned with the circuit board 13, which is penetrated by threaded holes 17 and cavities 18.

The connection element 10 comprises an outer ring 19 and an inner ring 20 and also has locking springs 21. The contact arrangement provided for the electricity supply of the circuit board 13 is not shown in the exemplary embodiments.

Screw bolts 22 pass through fastening holes 23 in the outer ring 19 and, to fasten the outer ring 19 to the heat sink 12, are inserted into threaded holes 17 therein.

The outer ring 19 forms a receiving frame 24 into which the circuit board 13 is to be inserted.

Pins 25 rise from the underside of the outer ring 19 facing towards the arrangement surface 16. A receiving space 26 allows the inner ring 20 to be inserted into the outer ring 19. A vertical axis V, which is parallel to the direction of light emission or vertical to the arrangement plane, forms the central axis of the connection element 10.

Spring support legs 27 emerge from the inner ring 20 on its underside facing towards the arrangement surface 16. In addition, the inner ring 20 forms a central light passage opening 28 which surrounds the LED 14.

Figure 2:
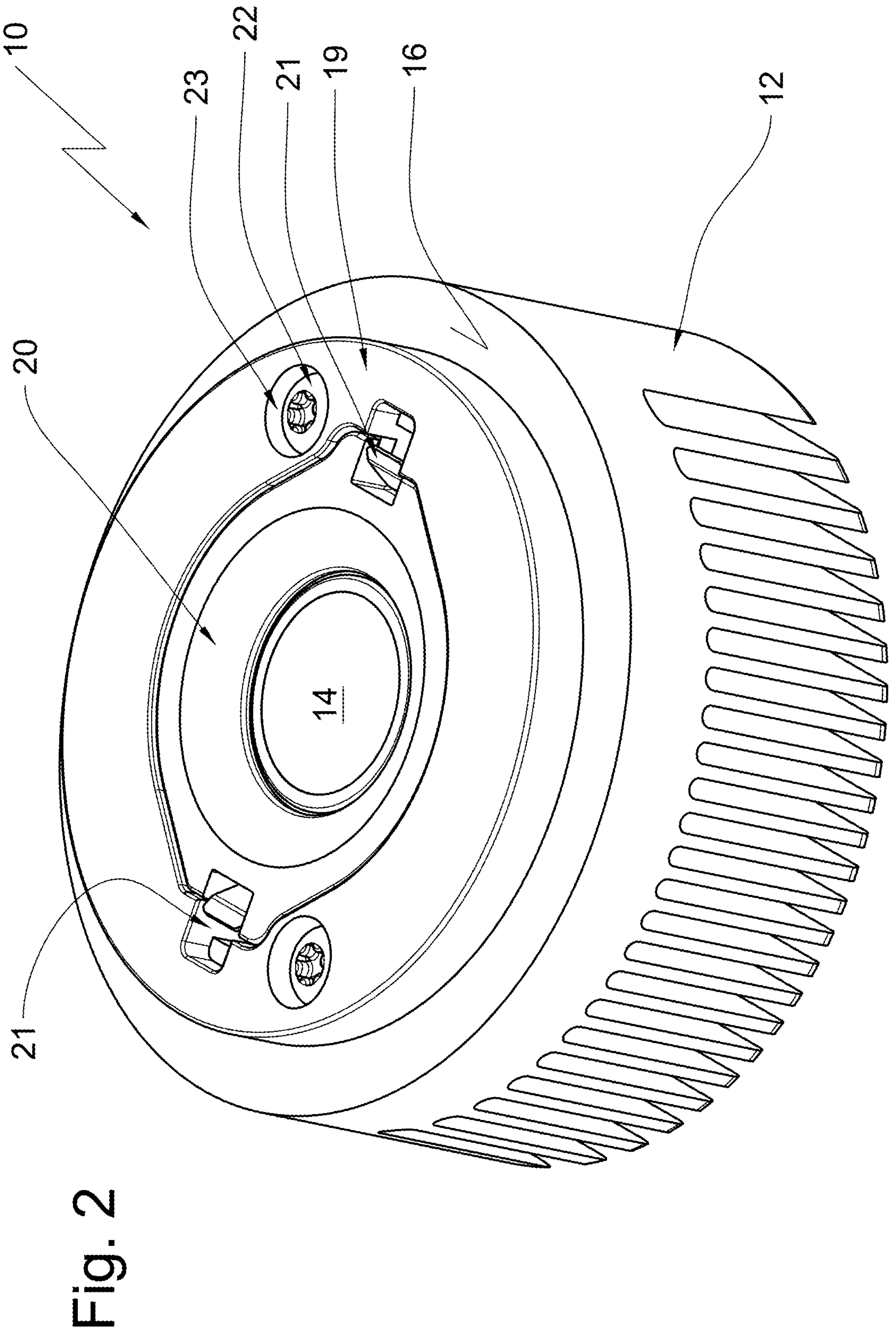
FIG. 2 shows the assembly according to FIG. 1 in assembled form.

FIG. 2 shows the assembly 100 according to FIG. 1 in assembled form. Here, the interaction of the components shown in FIG. 1 is already partially visible. The outer ring 20 rests on the arrangement surface 16 of the heat sink 12 with its underside facing towards the arrangement surface 16. The screw bolts 22 are seated in the fastening holes 23 and engage with their threaded shaft into the threaded holes 17 of the heat sink 12 (which are not visible here because they are covered by the outer ring 19). In this way, the outer ring 19 is firmly arranged on the heat sink 12 or counter-bearing 11.

As one can imagine, the pins 25 rising from the underside of the outer ring 19 are seated in the cavities 18 of the heat sink 12 so that the outer ring 19 can lie flat on the arrangement surface 16.

The locking springs 21 are seated in the pin 25 respectively assigned to them, the spring support legs 27 also penetrating into the respectively assigned pins 25. In this way, the inner ring 20 can lie in the receiving space 26 of the outer ring 19 (not designated here) and surround the LED 14 with its light passage opening 28 (not designated here).

Figure 3:
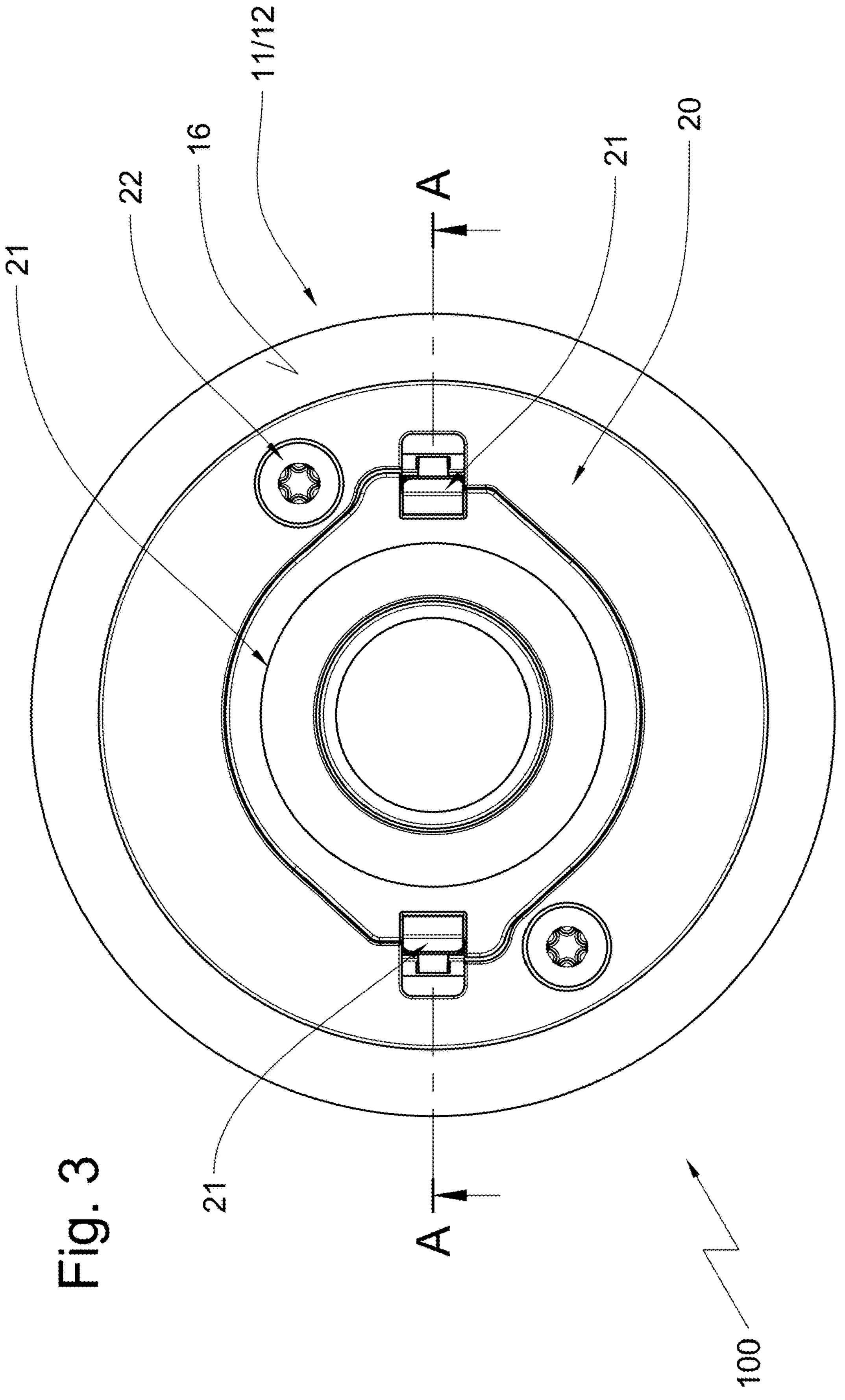
FIG. 3 shows the assembly according to FIG. 2 in a view from above.

FIG. 3 shows a plan view of the assembly 100 according to FIG. 2 and serves in particular to illustrate the position of the section along section line A-A for FIGS. 4 and 5 described below.

Figure 4:
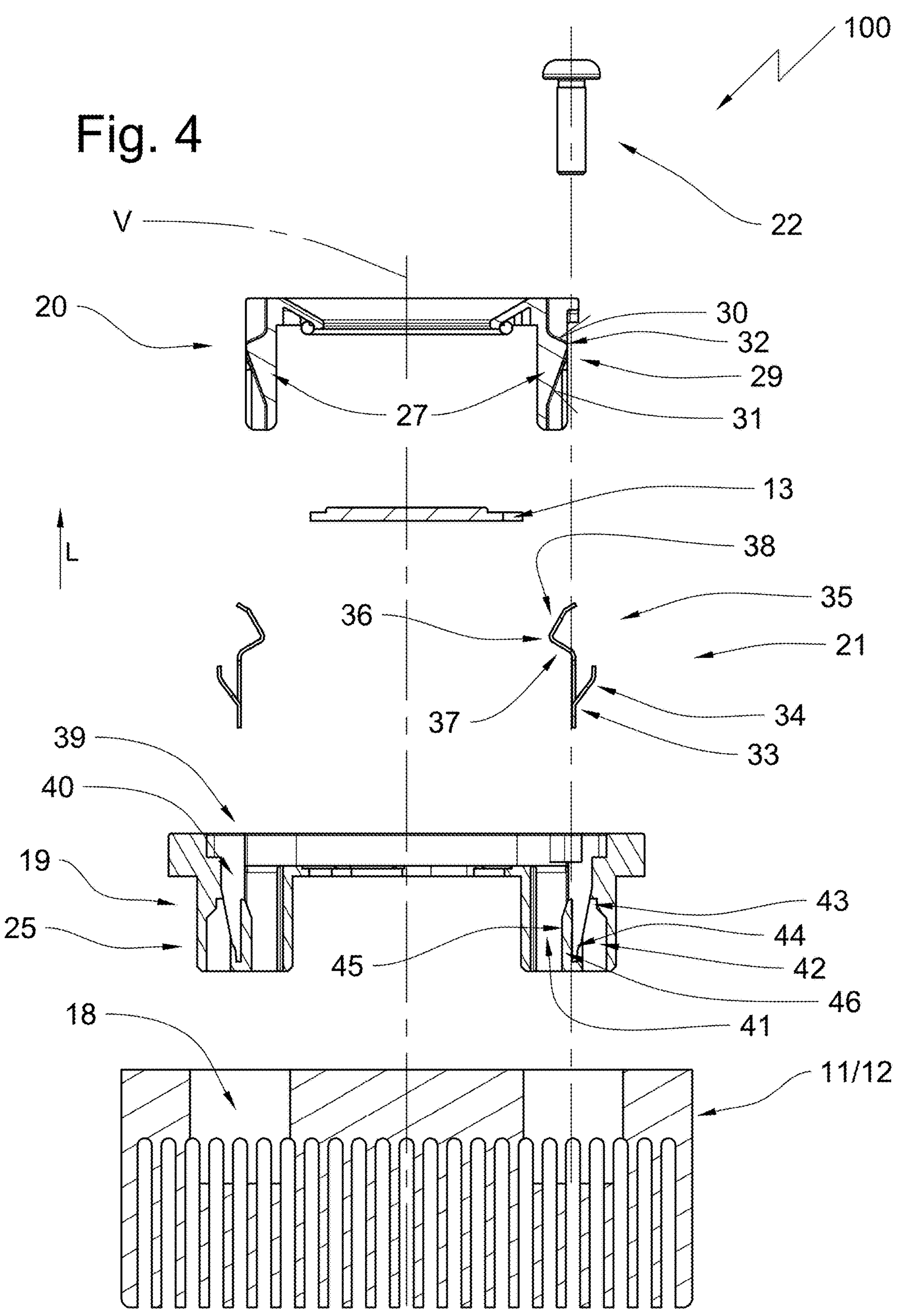
FIG. 4 shows a sectional view of the assembly along section line A-A in FIG. 3.
Figure 5:
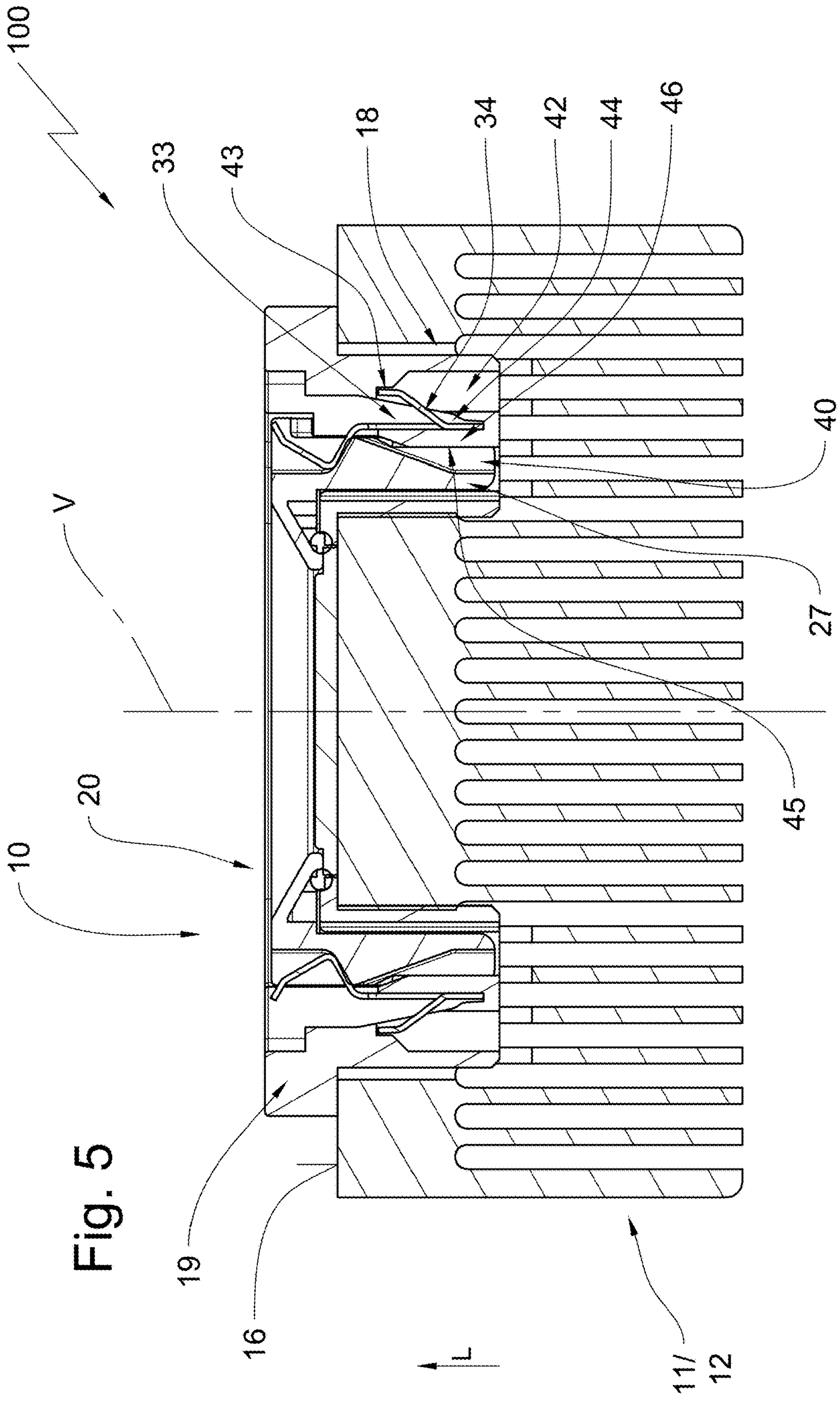
FIG. 5 shows a sectional view of the assembled assembly in FIG. 3 along section line A-A.

FIGS. 4 and 5 show a sectional view through the assembly 100, wherein FIG. 4 is an exploded view of the section and FIG. 5 is a sectional view of the assembly 100 in the assembled state.

The sectional view according to FIG. 4 shows the inner ring 20. Each spring support leg 27 forms a locking lug 29 which points radially outwards with respect to the direction of light emission L or the vertical axis V. Each locking lug 29 has a locking surface 30 pointing towards the top opposite the counter-bearing 11 and a spreading surface 31 pointing in the direction of the counter-bearing 11. Starting from a locking lug vertex 32, which at the same time defines the maximum radial extension of the locking lug 29 outwards, the locking surface 30 rises as an inclined surface in the direction of the vertical axis V. The spreading surface 31, on the other hand, is formed as an inclined surface on the spring support leg 27 that slopes down in the direction of the vertical axis V.

FIG. 4 also shows the locking springs 21. These first comprise a spring leg 33 which serves as a locking leg 34 for anchoring in the outer ring 19, in particular within its pin 25. In the specific embodiment, the locking leg 34 is directed radially outwards and towards the top of the connection element 10 facing away from the counter-bearing 11. However, this is not a mandatory requirement for the functioning of the locking leg 34. In the exemplary embodiment, the locking leg 34 also emerges from the lower end of the spring leg 33 facing towards the heat sink 12.

At its end facing towards the top of the connection element 10, the spring leg 33 carries a locking contour which is provided as a whole with the reference numeral 35 and is directed radially inwards in the direction of the inner ring 20. Starting from a locking contour vertex 36, which simultaneously defines the maximum radial inner position of the locking contour 35, a retaining leg 37 slopes down obliquely in the direction of the heat sink 12 and ends in the spring leg 33. In the direction of the top of the connection element 10, a spreading leg 38 extends radially outwards from the locking contour vertex 36 and forms the free, upper end of the locking spring 21.

FIG. 4 also gives a detailed view inside the pin 25 of the outer ring 19.

Firstly, the pin 25 has an insertion opening 39 towards the top of the connection element 10, which allows access to the pin interior 40. The pin interior 40 can be divided into various functional areas as described below.

Firstly, the pin interior 40 provides a spring support leg receptacle 41 into which the spring support leg 27 is inserted when the connection element 10 is assembled (see FIG. 5). The spring support leg receptacle 41 is arranged radially inward in the pin interior 40.

A locking leg receptacle 42 is provided radially outwardly in the pin interior 40. This also forms a locking leg seat 43. The free end of the locking leg 34 is supported on this locking leg seat 43 for anchoring the locking spring 21 in the pin 25. The arrangement of the locking leg 34 in the locking leg receptacle 42 including the anchoring of the locking leg 34 in the locking leg seat 43 is shown in FIG. 5.

A spring leg shaft 44 is formed in the pin 25 between the spring support leg receptacle 41 and the locking leg receptacle 42. For the spring support leg receptacle 41, the spring leg shaft 44 is bordered by a support wall 45 which prevents an excessive displacement of the spring leg 33 radially inwards in the direction of the spring support leg. In the direction of the locking leg receptacle 42, the spring leg shaft 44 is bordered by a guide pin 46 which holds the lower end of the spring leg 33 in a stable position in the spring leg shaft 44 and prevents the spring leg 33 from jumping over into the locking leg receptacle 42.

The support wall 45 as well as the guide pin 46 are directed vertically to the arrangement surface of the counter-bearing 11 or parallel to the vertical axis V, so that the functional spaces, namely the spring support leg receptacle 41, the locking leg receptacle 42 and the spring leg shaft 44 are vertically separated from one another and accessible via the insertion opening 39 of the pin 25.

From the combination of FIGS. 4 and 5 it is evident how the assembly 100, in particular the connection element 10, is assembled.

Firstly, the locking springs 21 are inserted into the respective associated pin 25 counter to the direction of light emission L, that is to say from the top of the connection element 10. The spring legs 33 enter the spring leg shaft 44 here. At the same time, the locking leg 34 is held in the locking leg seat 43 of the locking leg receptacle 42. In this way, the locking spring 21 locks in the pin 25. The locking contour 35 of the locking spring 21 extends radially inwards in the direction of the vertical axis V into the spring support leg receptacle 41.

The outer ring 19 is now placed on the heat sink 12, the pins 25 being inserted into the cavities 18. In this way, the underside of the outer ring 19 facing towards the heat sink 12 comes to rest on the arrangement surface 16 of the heat sink 12.

To assemble the assembly 100, the circuit board 13, that is to say the LED light source, is now inserted into the receiving frame 24 formed by the outer ring 19, so that the underside of the circuit board 13 likewise rests on the arrangement surface 16 of the heat sink 12. If applicable, heat conducting agents—not shown in the drawings—are arranged between the circuit board 13 and the heat sink 12.

Within the outer ring 19, the circuit board 13 is now securely held against horizontal displacement or displacement parallel to the arrangement surface.

The inner ring 20 is now placed on the outer ring 19 counter to the direction of light emission L. The spring support legs 27 are inserted here into the respectively associated pin 25 and there into the corresponding spring support leg receptacle 41. In this case, the spreading surfaces 31 of the respective locking lug 29 come into contact with the respectively associated spreading leg 38 of the locking spring 21, the resulting inclined surface pairing 31/38 leading to a displacement of the locking contour 35 radially outwards. This movement reaches its maximum when the locking contour vertex 36 is on the locking lug vertex 32. Subsequently, as the insertion movement continues counter to the direction of light emission L, the retaining legs 37 engage with the respective locking surface 30 of the locking lug 29. In this case, the locking contour 35 is displaced radially inwards in an elastic manner returning the spring, the inclined surface pairing 31/38 between the holding leg 37 and the locking surface 30 applying a force component to the inner ring 20 directed in the direction of the arrangement surface 16. As a result, the inner ring 20 is clamped against the inserted circuit board 13 and ensures sufficient contact pressure of the circuit board 13 on the heat sink 12 in order to promote optimal heat dissipation. In the same way—not described in further detail here—the aforementioned force component, which clamps the inner ring 20 in the direction of the arrangement surface 16, also promotes correct contact of the contact arrangement on the contact fields 15 of the circuit board 13 in order to achieve correct electrical contact values.

Owing to the locking pins 25 extending into an area below the arrangement surface 16, a sufficiently large space is created to create a spring element in the form of the locking spring 21 which is elongated in the direction of light emission L or parallel to the vertical axis V and which, via its longitudinal extension of the spring leg 33 within the spring leg shaft 44, offers sufficiently large spring travel for holding the inner ring 20 in the outer ring 19.

Figure 6:
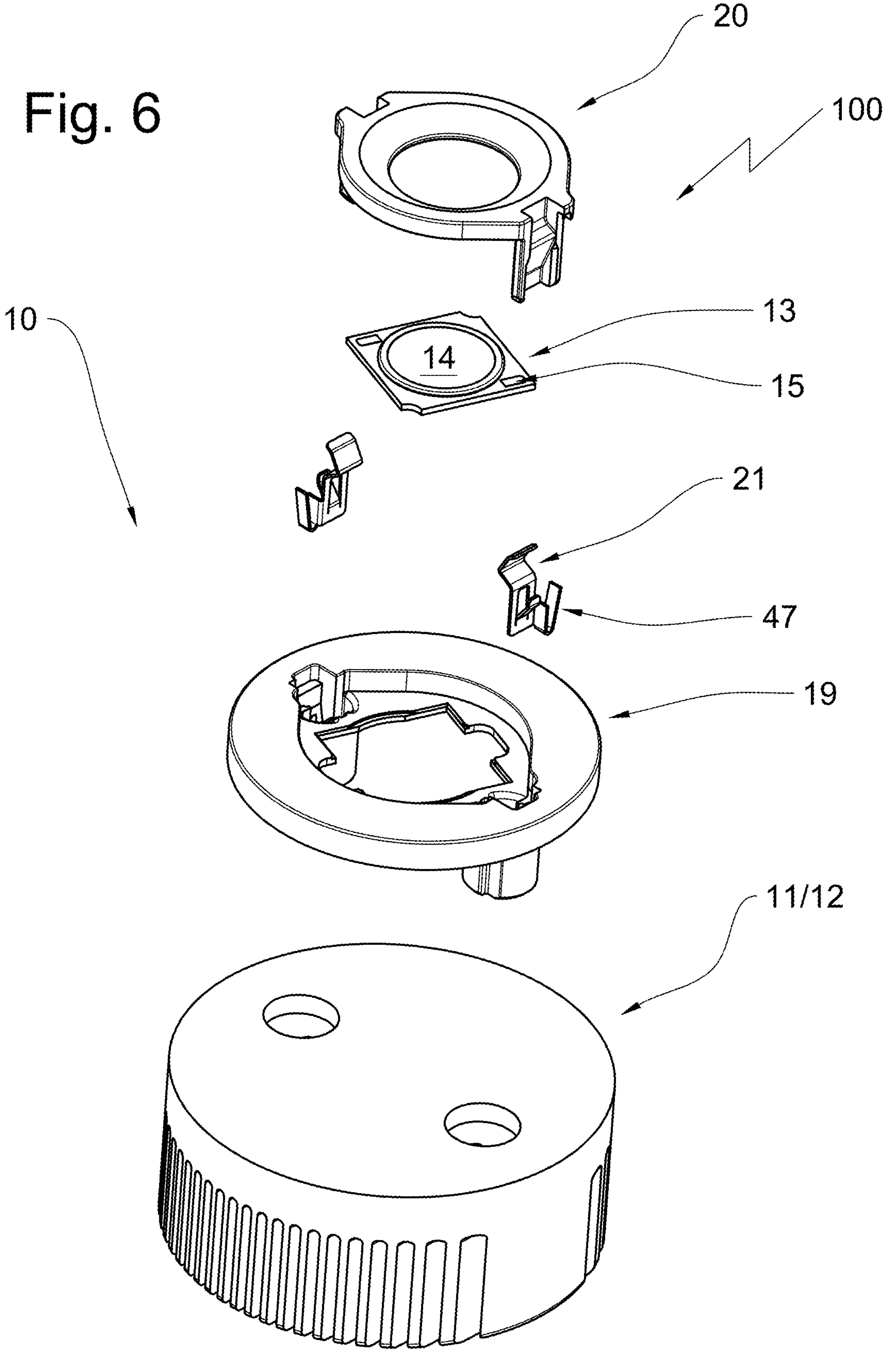
FIG. 6 shows an exploded view of an alternative embodiment.

FIG. 6 shows an exploded view of an alternative embodiment. The statements made in relation to FIG. 1 also apply to this depiction. This is also an assembly 100 with a connection element 10, which holds an LED light source—consisting of a circuit board 13 with contact fields 15 and LED 14—on a counter-bearing 11 in the form of a heat sink 12. The connection element 10 is divided into an outer ring 19 and an inner ring 20, wherein the outer ring 19 carries locking springs 21 for holding the inner ring 20.

The statements made in relation to the first embodiment also apply to the second embodiment. However, the two embodiments differ with regard to the fastening of the connection element 10 to the heat sink 12. As shown in FIG. 6, the locking spring 21 has an additional component in the form of a fixing pin 47 which returns the spring in an elastic manner and is arranged on the locking spring 21 as an additional locking means. This—as will be described shortly—serves to fasten the outer ring 19 to the heat sink 12 so that the screw bolts 22 known from the first exemplary embodiment can be dispensed with.

Figure 7:
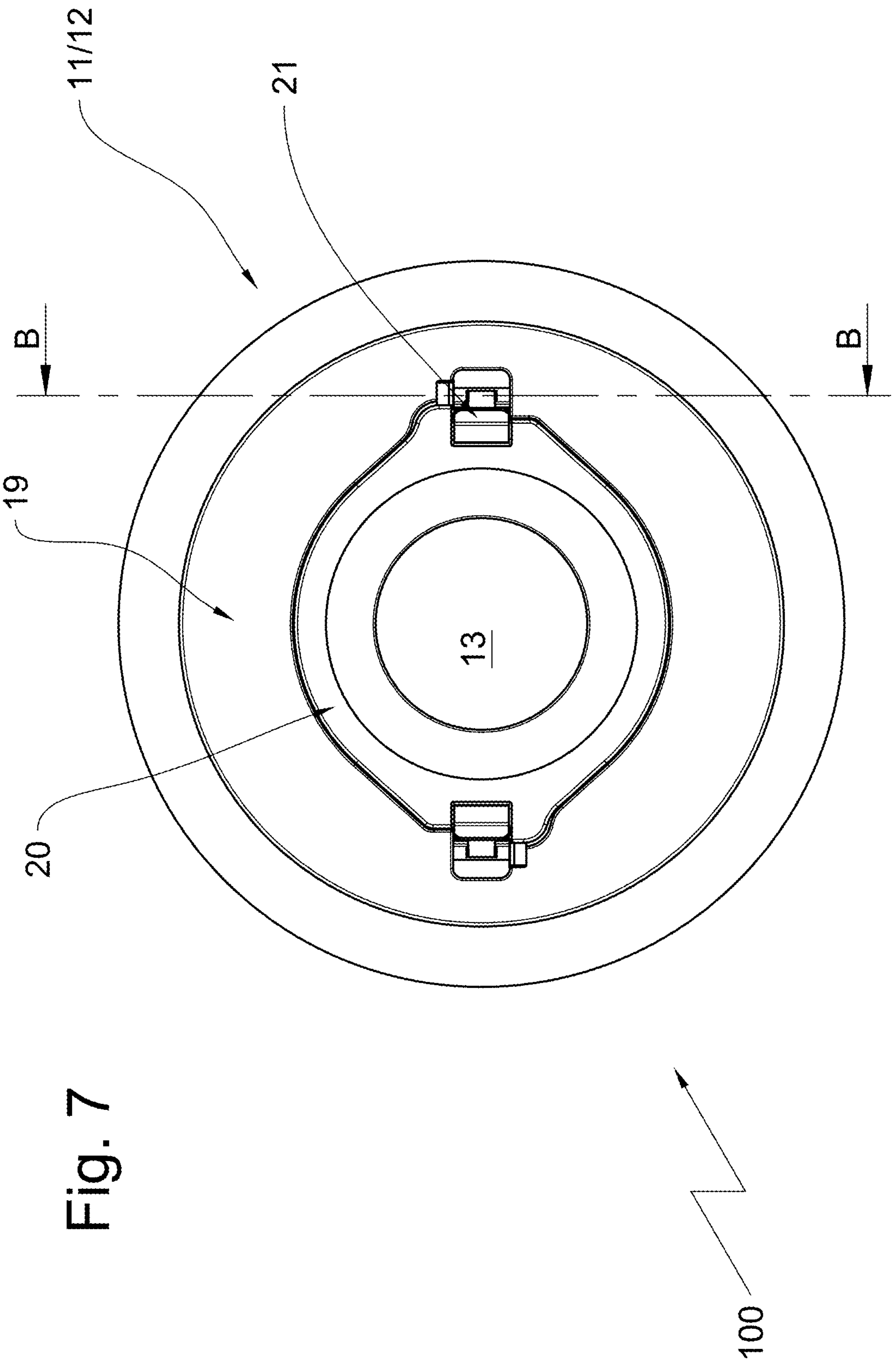
FIG. 7 shows a view from above of the embodiment according to FIG. 6.

FIG. 7 shows the second embodiment in assembled form. FIG. 7 serves in particular to illustrate the position of the section line B-B for which FIG. 8 is the corresponding sectional view.

Figure 8:
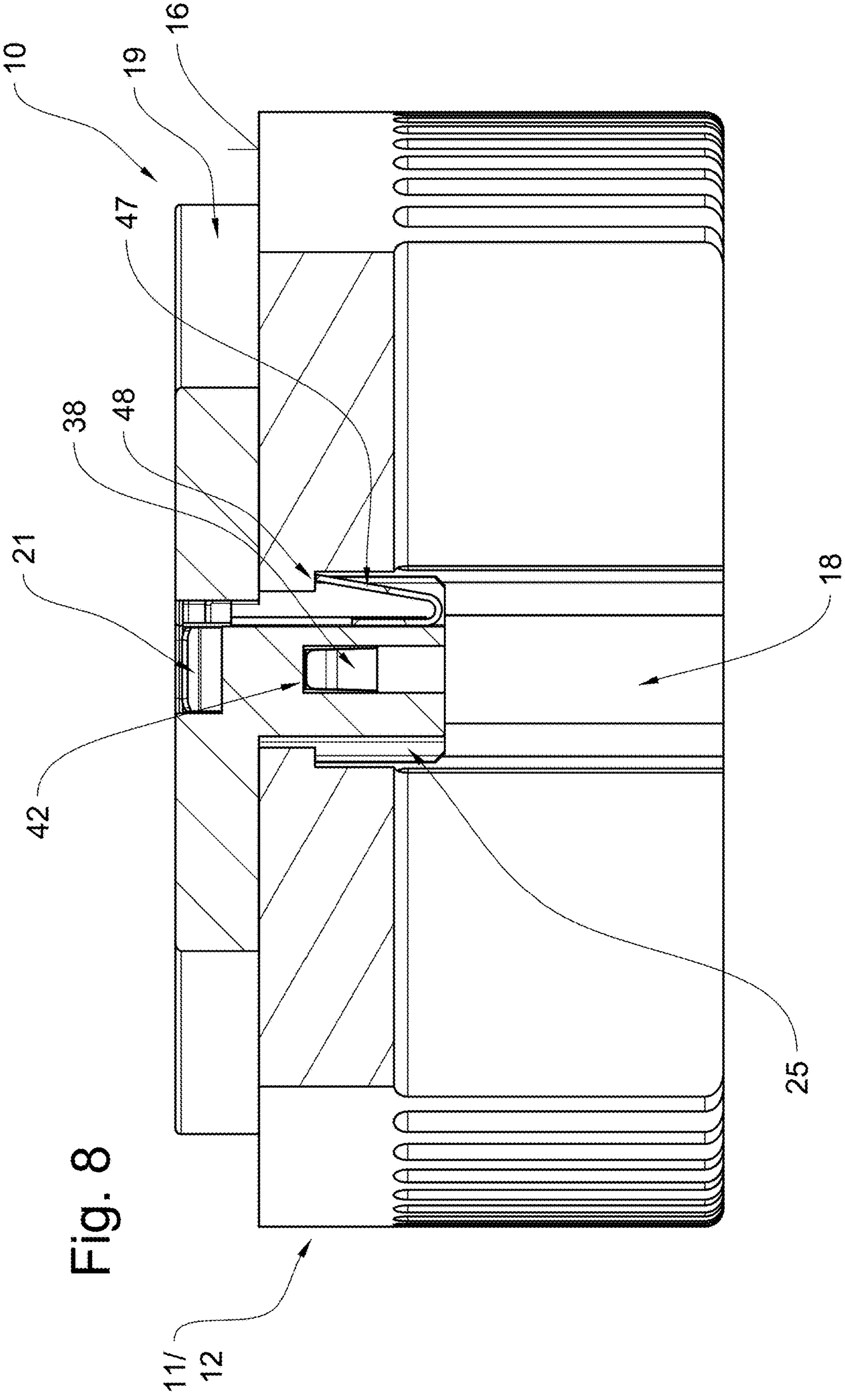
FIG. 8 shows a sectional view along section line B-B as in FIG. 6.

FIG. 8 first shows the heat sink 12 with the cavity 18 known from the first embodiment which extends from the top of the heat sink 12 provided with the connection element 10 to its underside as a continuous hole. The cavity 18 has a step 48 which narrows the cavity diameter and contributes to the fixing of the outer ring 19 of the connection element 10. The locking spring 21 is anchored in the outer ring 19. Owing to the position of the sectioning, the locking leg 34 of the locking spring 21 can be seen seated in the locking leg receptacle 42. It can also be seen from FIG. 8 how the fixing pin 47, which in the second embodiment is additionally arranged on the locking spring 21, engages behind the step 48 in the manner of a locking element and thus holds the locking spring 21 in the cavity 18. Through the connection between the locking spring 21 and the outer ring 19, the outer ring 19 is thereby firmly anchored on the heat sink 12 and the outer ring 19 in turn holds the inner ring 20 (not visible here) so that the connection element 10 is arranged on the heat sink 12 via the locking spring 21.

Advantageously, additional screw bolts 22 for fixing the connection element 10 on the heat sink 12 can be dispensed with.

The pin 25 can be configured as a type of expansion dowel. The locking pin 25 can be expanded in circumference via slots in the locking pin 25 that are aligned vertically to the arrangement surface 16 and an expansion element that can be inserted into the locking pin 25 so that it lies in the cavity 18 of the heat sink 12 in a friction-fitting or form-fitting manner. The locking spring 21 can serve as an expansion element here.

LIST OF REFERENCE NUMERALS

10 Connection element
11 Counter-bearing
12 Heat sink
13 Circuit board
14 LED
15 Contact field
16 Arrangement surface
17 Threaded hole
18 Cavity
19 Outer ring
20 Inner ring
21 Locking spring
22 Screw bolts
23 Fastening holes
24 Receiving frame
25 Pin
26 Receiving space
27 Spring support leg
28 Light passage opening
29 Locking lug
30 Locking surface

31 Spreading surface
32 Locking lug vertex
33 Spring leg
34 Locking leg
35 Locking contour
36 Locking contour vertex
37 Holding leg
38 Spreading leg
39 Insertion opening
40 Pin interior
41 Spring support leg receptacle
42 Locking leg receptacle
43 Locking leg seat
44 Spring leg shaft
45 Support wall
46 Guide pin
47 Fixing pin
48 Step
V Axis
L Direction of light emission
100 Assembly

What is claimed is:

1. A connection element (10) for electrically connecting an LED light source, the LED light source having a circuit board (13) with contact fields (15) for electrically supplying an LED (14), the connection element (10) comprising:

a frame (24) configured to rest on an arrangement surface (16) of a counter-bearing (11) and to hold the circuit board (13) on the arrangement surface (16), wherein the frame is formed by an outer ring (19) and an inner ring (20), wherein the inner ring (20) is held within the outer ring (19) and configured to be overlaid on the circuit board (13) at least in some areas and thereby hold the circuit board (13) vertically to the arrangement surface (16) on the counter-bearing (11), and wherein the outer ring (19) is configured to surround the circuit board (13) and to hold the circuit board (13) parallel to the arrangement surface (16) on the counter-bearing (11);

locking lugs (29) which are formed by the inner ring (20);

locking springs (21) arranged in the outer ring (19) to overlap the locking lugs (29) of the inner ring (20) and to exert a tensile force on the inner ring (20) towards the arrangement surface (16); and a spring receiving space for the locking spring (21), wherein the spring receiving space extends in relation to the frame (24) resting on the arrangement surface (16) into an area below the arrangement surface (16), wherein the spring receiving space is formed in a pin (25) which rises from an underside of the outer ring (19).

2. The connection element (10) according to claim 1, wherein the locking spring (21) is held in a form-fitting manner in the pin (25).

3. The connection element (10) according to claim 1, wherein the spring receiving space extends into a cavity (18) in the counter-bearing (11).

4. The connection element (10) according to claim 1, wherein the spring receiving space extends into a cavity (18) in the counter-bearing (11), and wherein the pin (25) is seated in the cavity (18).

5. The connection element (10) according to claim 4, wherein the inner ring (20) forms a spring support leg (27) which carries a locking projection.

6. The connection element (10) according to claim 5, wherein the spring support leg (27) protrudes into the spring receiving space and rests against a wall bordering the spring receiving space.

7. The connection element (10) according to claim 6, wherein the spring support leg (27) is supported on a wall section of the counter-bearing (11) bordering the cavity (18).

8. The connection element (10) according to claim 6, wherein the spring support leg (27) is supported on the pin (25) rising from the outer ring (19).

9. The connection element (10) according to claim 4, wherein the pin (25) is configured as an expansion dowel in order to hold the outer ring (19) in a form-fitting or friction-fitting manner on the counter-bearing (11).

10. The connection element (10) according to claim 1, wherein the locking spring (21) arranged in the outer ring (19) fixes the inner ring (20) to the outer ring (19) and the outer ring (19) to the counter-bearing (11).

* * * * *